US010205768B2

(12) United States Patent
Cunico et al.

(10) Patent No.: US 10,205,768 B2
(45) Date of Patent: Feb. 12, 2019

(54) FACILITY FOR INITIATING AUTOMATIC EXCHANGE OF FILE(S) BETWEEN MOBILE DEVICES

(71) Applicant: INTERNATIONAL BUSINESS MACHINES CORPORATION, Armonk, NY (US)

(72) Inventors: Hernan A. Cunico, Holly Springs, NC (US); Martin G. Keen, Cary, NC (US); Chris Rayns, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 15/414,848

(22) Filed: Jan. 25, 2017

(65) Prior Publication Data

US 2018/0213023 A1    Jul. 26, 2018

(51) Int. Cl.
*H04L 29/08* (2006.01)
*H04W 4/08* (2009.01)
(Continued)

(52) U.S. Cl.
CPC .......... *H04L 67/06* (2013.01); *G06F 11/3438* (2013.01); *G06Q 50/01* (2013.01);
(Continued)

(58) Field of Classification Search
CPC ....... H04W 12/04; H04W 12/08; H04W 4/08; H04L 63/083; H04L 63/104; H04L 63/0823
(Continued)

(56) References Cited

U.S. PATENT DOCUMENTS 7,860,922 B2 * 12/2010 Singer ................ H04L 63/0823
709/203
7,860,923 B2 * 12/2010 Singer ................ H04L 63/0823
709/203
(Continued)

FOREIGN PATENT DOCUMENTS

WO    WO2006056935 A2    6/2006

OTHER PUBLICATIONS

International Business Machines Corporation, "Ad Hoc Mobile Social Networking for Professionals", IP.com No. IPCOM000159275D, Oct. 16, 2007, (4 pages).
(Continued)

*Primary Examiner* — Man U Phan
(74) *Attorney, Agent, or Firm* — Michael Petrocelli, Esq.; Kevin P. Radigan, Esq.; Heslin Rothenberg Farley & Mesiti P.C.

(57) ABSTRACT

A facility is provided for automatically exchanging, via mobile ad hoc network transfer, a file between mobile devices based on derived user preferences and context. The facility includes monitoring use of one or more files received on a mobile device. Contextual user preferences are derived for one or more future automated file transfers to the mobile device based on the monitoring. A contextual user preference request is sent from the mobile device to an other mobile device based, at least in part, on the other mobile device being within mobile ad hoc network transfer range of the mobile device. The contextual user preference request asks that at least one file on the other mobile device related to at least one of the contextual user preferences be automatically transferred to the mobile device using mobile ad hoc network transfer.

15 Claims, 8 Drawing Sheets

(51) Int. Cl.
*G06F 11/34* (2006.01)
*G06Q 50/00* (2012.01)
*H04W 84/18* (2009.01)

(52) U.S. Cl.
CPC ............ *H04L 67/22* (2013.01); *H04L 67/306* (2013.01); *H04W 4/08* (2013.01); *H04W 84/18* (2013.01)

(58) Field of Classification Search
USPC .......................... 370/338–345; 709/203–244; 455/419–452
See application file for complete search history.

(56) References Cited

U.S. PATENT DOCUMENTS

| | | | | |
|---|---|---|---|---|
| 8,219,028 B1* | 7/2012 | Flamholz | ............... | G06F 1/1694 455/41.2 |
| 8,732,319 B2* | 5/2014 | Tian | ...................... | H04W 8/005 709/228 |
| 9,118,771 B2 | 8/2015 | Rodriguez | | |
| 9,325,380 B2* | 4/2016 | Cieslak | ............... | H04B 5/0012 |
| 9,369,943 B2 | 6/2016 | Li et al. | | |
| 9,374,136 B2* | 6/2016 | Boldyrev | ............. | H04B 5/0031 |
| 9,686,820 B2* | 6/2017 | Chetlur | ................. | H04W 84/18 |
| 9,838,082 B2* | 12/2017 | Dobyns | ................. | H04W 76/16 |
| 9,872,174 B2* | 1/2018 | Chen | .................... | H04L 63/0823 |
| 2004/0203381 A1* | 10/2004 | Cahn | ................... | H04B 5/0012 455/41.2 |
| 2009/0006972 A1 | 1/2009 | Karlson et al. | | |
| 2009/0144435 A1 | 6/2009 | Naniyat | | |
| 2009/0150569 A1 | 6/2009 | Kumar et al. | | |
| 2010/0257239 A1* | 10/2010 | Roberts | .................. | G06Q 10/10 709/204 |
| 2013/0325952 A1 | 12/2013 | Draznin et al. | | |
| 2016/0248627 A1* | 8/2016 | Hillan | ................. | H04L 41/0806 |

OTHER PUBLICATIONS

Dey et al, "Context-Awareness and Mobile Devices", IGI Global, 2008, (pp. 205-217).

Mel, Peter and Tim Grance, "The NIST Definition of Cloud Computing," National Institute of Standards and Technology, Information Technology Laboratory, Special Publication 800-145, Sep. 2011, pp. 1-7.

Anonymous, "Method for Creating an Ad-Hoc Social Network Built Across Networked Devices", IP.com No. IPCOM000212372D, Nov. 8, 2011, (7 pages).

Mcgonigal et al., "Distributed Download Over an Ad-Hoc Network", IP.com No. IPCOM000239019D, Oct. 1, 2014, (4 pages).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

* cited by examiner

FACILITY FOR INITIATING AUTOMATIC EXCHANGE OF FILE(S) BETWEEN MOBILE DEVICES

BACKGROUND

There currently exist a variety of portable computing devices (i.e., mobile devices), including wireless computing devices, such as mobile telephones, personal digital assistants (PDA's), tablets, laptop computers, wireless computers, etc., which are small, lightweight and easily carried by users. These mobile devices (including cellular telephones, internet protocol (IP) telephones, smartphone devices, etc.) can communicate audio and data packets over wireless networks. In addition, mobile devices may possess various software applications, such as a web browser application, a music player, an email program, games, etc., which allow a user to personalize configuration and use of the mobile device.

Providing enhancements to mobile devices, or software applications for mobile devices, continues to be an area of interest and ongoing research for, for instance, establishing commercial advantage in the industry.

SUMMARY

Shortcomings of the prior art are overcome and additional advantages are provided through the provision of a computer-implemented method, which includes monitoring use of one or more files received on a mobile device. Additionally, the method includes deriving contextual user preferences for one or more future automated file transfers to the mobile device based on the monitoring, and sending a contextual user preference request from the mobile device to an other mobile device based, at least in part, on the other mobile device being within mobile ad hoc network transfer range of the mobile device. The contextual user preference request asks that at least one file on the other mobile device related to at least one of the contextual user preferences be automatically transferred to the mobile device using mobile ad hoc network transfer.

In another aspect, a system is provided for facilitating mobile ad hoc network exchange of a file between mobile devices. The system includes a memory, and a processing circuit communicatively coupled to the memory. The system performs a method, which includes monitoring use of one or more files received on a mobile device. The method also includes deriving contextual user preferences for one or more future automated file transfers to the mobile device based on the monitoring, and sending a contextual user preference request from the mobile device to an other mobile device based, at least in part, on the other mobile device being within mobile ad hoc network transfer range of the mobile device. The contextual user preference request asks that at least one file related to at least one of the contextual user preferences be automatically transferred to the mobile device using mobile ad hoc network transfer.

In a further aspect, a computer program product is provided for facilitating mobile ad hoc network exchange of a file between mobile devices. The computer program product includes a computer readable storage medium having computer readable program code embodied therewith, which is executable by a processor to perform a method, including: monitoring use of one or more files received on a mobile device; deriving contextual user preferences for one or more future automated file transfers to the mobile device based on the monitoring; and sending a contextual user preference request from the mobile device to an other mobile device based, at least in part, on the other mobile device being within mobile ad hoc network transfer range of the mobile device. The contextual user preference request asks that at least one file related to at least one of the contextual user preferences be automatically transferred to the mobile device using mobile ad hoc network transfer.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, known protocols, structures and techniques have not been shown in detail in order not to obscure the invention. Those of ordinary skill in the art will appreciate that the described techniques and mechanisms may be applied to various systems to facilitate automatic exchange of files between mobile devices, in accordance with one or more aspects of the present invention.

Generally stated, disclosed herein is a facility for initiating an automatic exchange of one or more files between co-located mobile devices, based on derived user preferences and contextual awareness, using mobile ad hoc network transfer (such as via Apple™ AirDrop™) between the mobile devices. The facility disclosed, in part, learns by monitoring how a user makes use of a transferred file (such as a mobile ad hoc transferred file), derives preferences for future files that the user would like to receive based on cognitive analysis, and initiates a contextual transfer of one or more files from one or more co-located, authorized mobile devices without user involvement.

For instance, consider two mobile device users at a sports event. User A takes a picture on the user's mobile device and would like to share the picture with user B. Today, this can be performed without the need of an infrastructure network through direct ad hoc network transfer facilities, whereby user A manually initiates and oversees transfer of the picture to user B's mobile device. The facility disclosed herein advantageously enhances this process, by learning (for instance) that user B would always like to receive pictures like this, and when user A and user B are co-located (that is, their mobile devices are within a given range of each other needed for mobile ad hoc network transfer), files such as the photograph are to be automatically transferred between the two devices using a mobile ad hoc network connection.

Mobile ad hoc networks enable mobile devices to transfer files without the use of an existing infrastructure network. For instance, the service enables nearby devices to transfer files, even if those devices are not connected to the same external Wi-Fi network. This is typically achieved through a combination of Wi-Fi and Bluetooth. More particularly, the service may use, in one or more embodiments, Bluetooth to create a peer-to-peer Wi-Fi network between two mobile devices. Each mobile device creates a firewall around the connection and files may be sent directly between the two devices, including encrypted if desired. Both the receiving and sending devices need to be co-located though, for instance, within 30 feet or less of each other, that is, within a mobile ad hoc network transfer range.

Figure 1:
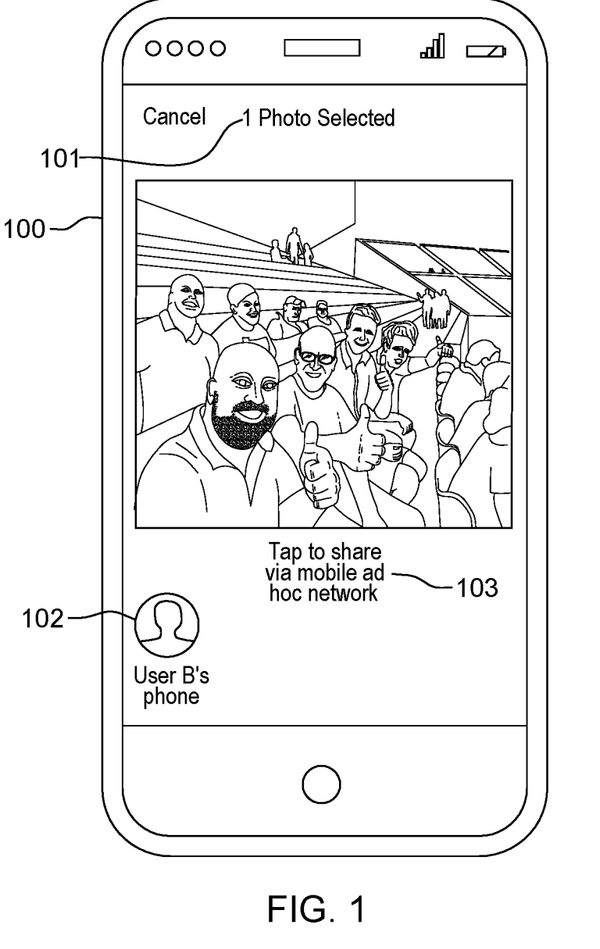
FIG. 1 depicts one embodiment of a mobile device which allows a user to select to send a file via mobile ad hoc network transfer from the mobile device to another, authorized mobile device.

A typical use of a mobile ad hoc network is depicted in FIG. 1. As shown, a mobile device 100 allows user A to select and share a photograph 101 with user B. Today this may be accomplished as follows. Both users' mobile devices are located within, for instance, 30 feet of each other, and have Bluetooth and Wi-Fi turned on, and have authorized mobile ad hoc network exchange between them. User A of mobile device 100 selects a picture 101 (or more generally a file) to share, and from a list of nearby AirDrop contacts 102, selects "user B's phone". A direct connection is created between the two mobile devices 103. Mobile device user B receives a notification requesting that a file from user A be exchanged. If user B accepts, the file is transferred to user B's mobile device.

Note that, the above process is, at least in part, a manual process. A mobile device user must wait until an intended contact is close by and manually select the file(s) to share. Disclosed herein is an automated approach for exchanging files between mobile devices across a mobile ad hoc network. In particular, described herein (in one or more aspects) is a facility which learns a user's preferences for what types of files or resources the recipient may wish to receive across a mobile ad hoc network, and on which devices of the recipient, and initiates an automatic exchange of such files (from one or more authorized contacts) via a mobile ad hoc network when the users' devices are within range.

As described further herein, the facility disclosed enables, by way of example, a variety of use cases. For instance, the facility enables automatically exchanging photographs between two users when the user's mobile devices are co-located based on the users preferences. As an example, a request may be transmittal to send user B all photographs that user B appears in that were taken at a sporting event, but do not automatically send photographs of user B in other settings. As another example, the facility disclosed herein may allow for automatically exchanging a spreadsheet document between two users, but only across specific devices. For instance, a request may be transmitted to send user B the latest project tracking spreadsheet, but only to user B's tablet device, not to user B's smartphone device. Further, the facility disclosed herein may be used to automatically exchange contact details when a group of users are co-located. For instance, a request may be transmitted to share user C's contact details only when user A and B are co-located. Note that as used herein co-located or co-location refers to the mobile devices being within range of each other sufficient to allow for mobile ad hoc network file transfer.

Figure 2:
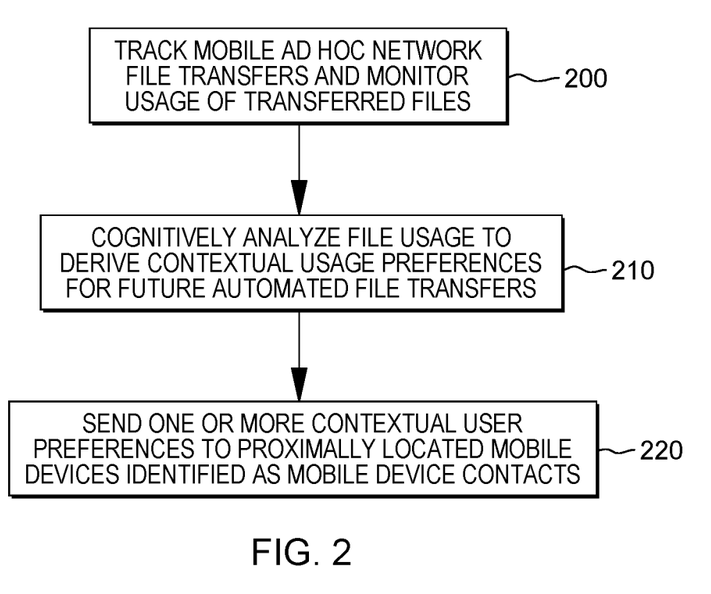
FIG. 2 depicts one embodiment of a process for automatically exchanging a file between mobile devices, in accordance with one or more aspects of the present invention.

By way of further example, FIG. 2 depicts one embodiment of a process for exchanging files between co-located mobile devices, in accordance with one or more aspects of the present invention. As shown, the process includes tracking or monitoring, for instance, via software, how files, such as pictures, documents, etc. received from another mobile device(s) via mobile ad hoc network transfer are being used on the mobile device receiving the files 200. Cognitive analysis of file usage is used to derive user preferences about what types of files the mobile device user would like to receive in the future from other mobile devices 210. One or more of these contextual user preferences may be exchanged with nearby or co-located mobile devices that are in a contact listing of the mobile device providing the contextual user preference(s) 220. Based on the other mobile device containing a file related to (e.g., matching) one or more of the user's preferences, the file is automatically sent by the other mobile device to the user's mobile device via mobile ad hoc network transfer.

Advantageously, the facility disclosed herein cognitively analyzes how files received on a mobile device, such as via mobile ad hoc network transfer, are used on that mobile device for the purpose of deriving user preferences for future automated file transfers to the mobile device. The facility sends one or more contextual user preferences to nearby mobile devices in the user's contacts list requesting that any files which related to or match derived user preferences be automatically forwarded using mobile ad hoc network transfer. Note also that, in one or more embodiments, only requests within the context of the device's current location are sent. Advantageously, an easy, intelligent approach is thus presented to sharing files between mobile device users.

Figure 3:
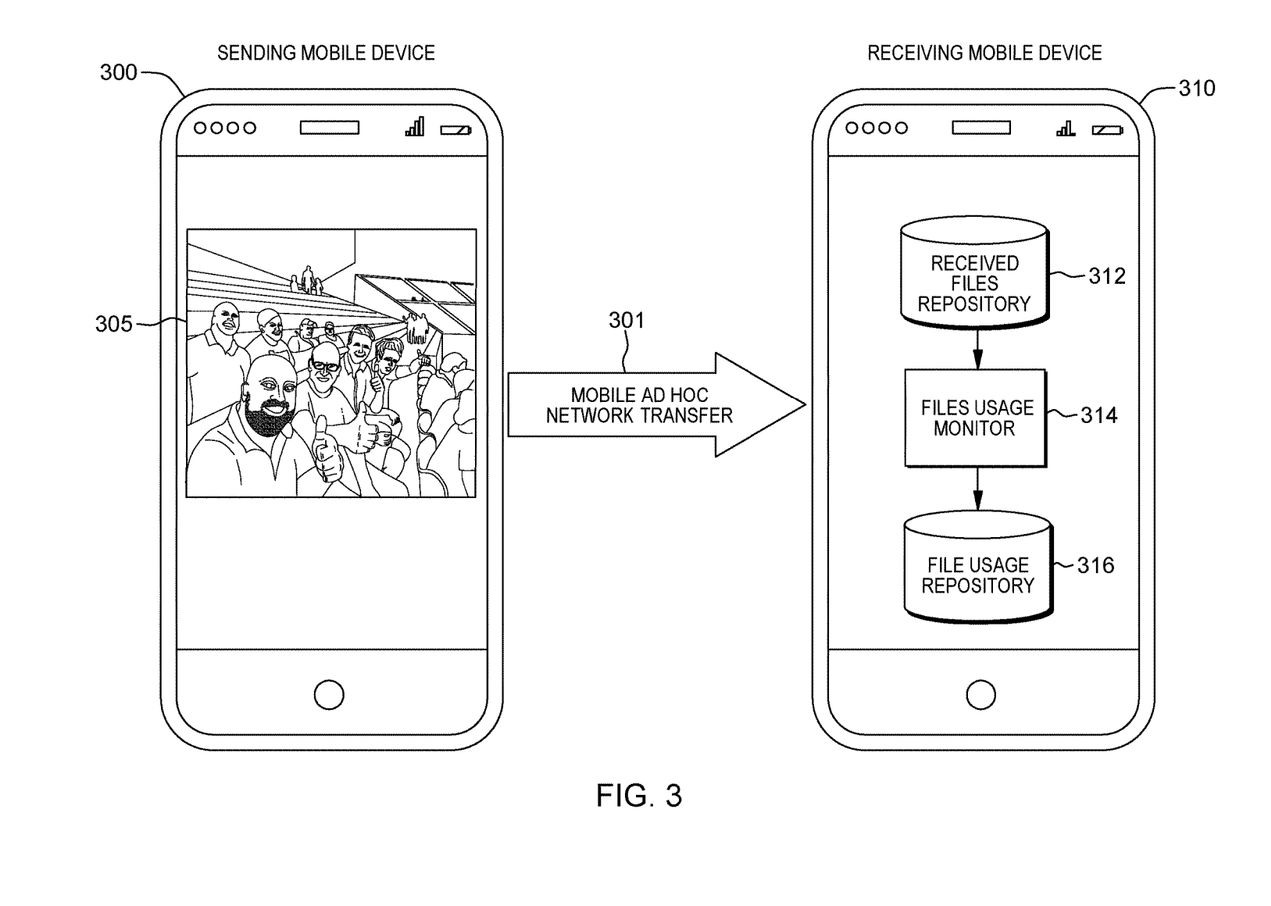
FIG. 3 depicts one embodiment of a process for tracking mobile ad hoc network file transfers and monitoring usage of transferred files, in accordance with one or more aspects of the present invention.
Figure 4:
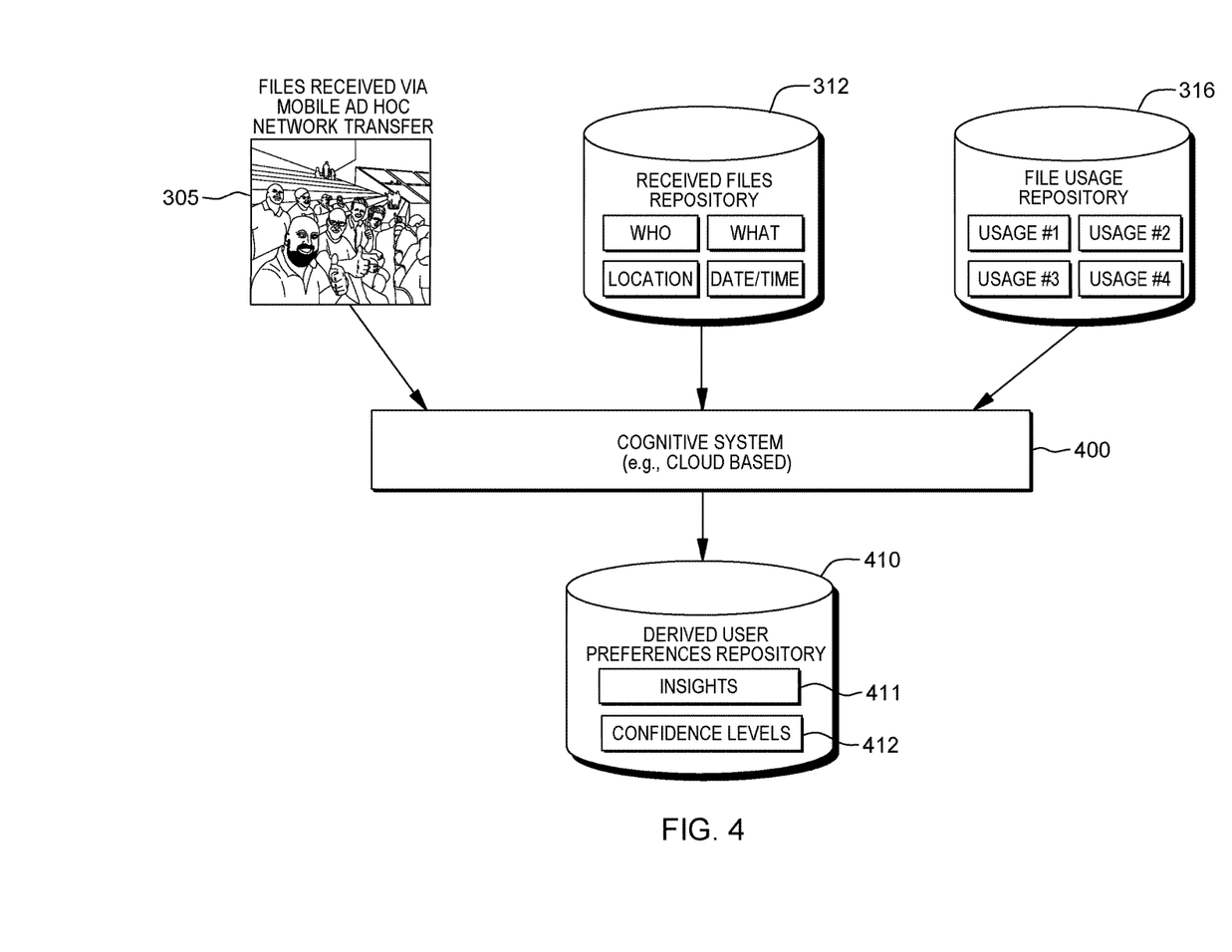
FIG. 4 depicts one embodiment of a process for cognitively analyzing transferred file usage to derive usage preferences for future automated file transfers, in accordance with one or more aspects of the present invention.
Figure 5:
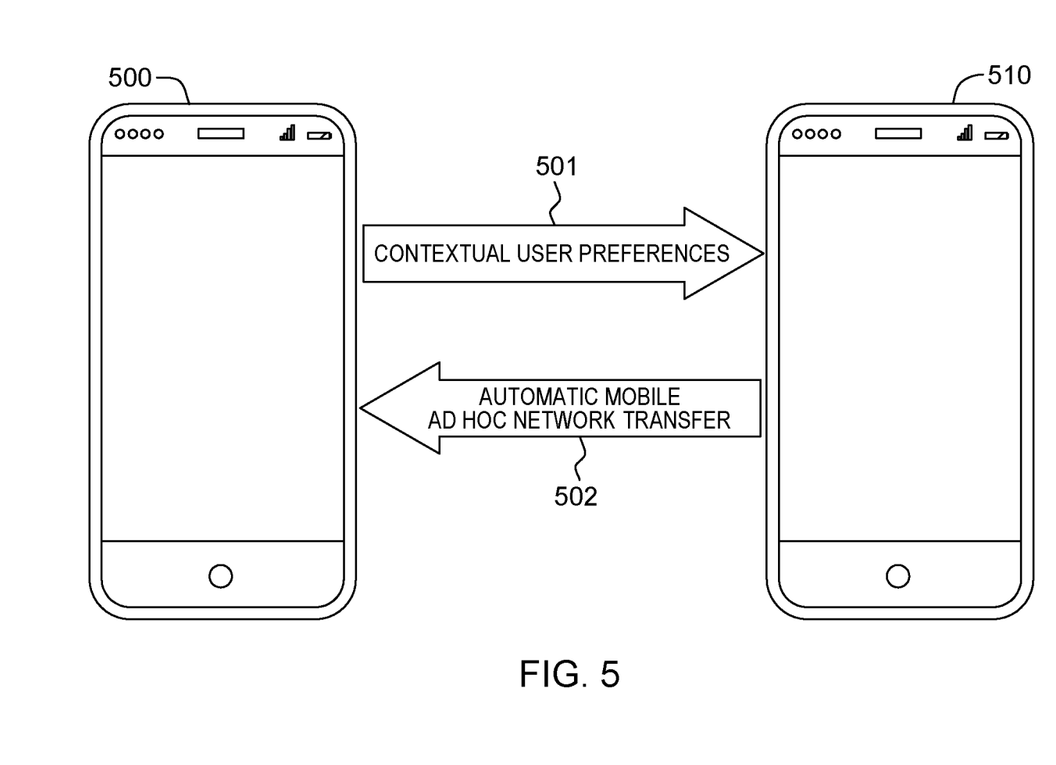
FIG. 5 depicts one embodiment of an exchange of a contextual user preference(s) with one or more proximally located, authorized mobile device(s) to initiate automatic mobile ad hoc network file transfer, in accordance with one or more aspects of the present invention.

FIGS. 3-5 depict a more detailed example of a facility such as disclosed herein. Referring to FIG. 3, a mobile ad hoc network transfer 301 is shown to be received at a mobile device 310 from another mobile device 300 which is co-located with mobile device 310. In the embodiment illustrated, a file 305, such as a photograph, document or other resource is transferred from mobile device 300 to mobile device 310. As shown, the facility monitors how files, such as photos, contacts, resources, etc. that were received via mobile ad hoc network transfer are being used on the mobile device. The files could be received, in part, manually (for instance, by one user manually sharing a photo with another user via a mobile ad hoc network connection), or could have been received automatically as described herein.

In operation, upon mobile device 310 receiving file 305 over a mobile ad hoc network, information about the transfer is stored in a received files repository 312. The stored information may include information such as the mobile device user who initiated the transfer and sent the file, what file was transferred, the location where the transfer took place (for instance, via a Global Positioning System (GPS) capability on the mobile device), and the date and time of the transfer. A file usage monitor 314 may track how and when the file is used on the mobile device 310. For instance, the file usage monitor 314 may determine whether the recipient immediately deleted the file upon receipt, or whether the recipient shared the file on a social network (for instance, shared the photo on Facebook), and may determine how many times the recipient made use of the file (for instance, how many times did the recipient view the photo). Each usage of the file, as tracked by the file usage monitor 314, may be recorded in a file usage repository 316.

FIG. 4 depicts a more detailed example of a cognitive analysis stage to derive user preferences, in accordance with one or more aspects of the present invention. This stage may make use of a cognitive system 400 to analyze how a user is utilizing files received from mobile ad hoc network transfers for the purposes of deriving their preferences for future such transfers. In one or more implementations, the cognitive system 400 may be, for instance, a cloud-based system. One such cognitive system is the Watson™ system available from International Business Machines Corporation of Armonk, N.Y., USA. The Watson™ system is an application of advanced natural language processing, information retrieval, knowledge representation and reasoning, and machine-learning technologies in the field of open domain question answering. The Watson™ system is built on International Business Machine Corporation's DeepQA™ technology used for hypothesis generation, massive evidence gathering, analysis, and scoring.

By way of example, cognitive system 400 may use as input data from the received files repository 312, which as noted may record who sent a file, what the file is, and when and where the file transfer occurred. Through analysis, patterns can emerge, such as a mapping file is always sent by a colleague when both colleagues are at an IBM facility location. Additionally, cognitive system 400 may reference the file usage repository 316, which as noted, records how received files are subsequently used. Through analysis this information can identify patterns such as learning which transferred files are unwanted because they are quickly deleted, and which files are more valued by the mobile device user because they have a high subsequent usage. Further, the file 305 itself may be employed by cognitive system 400. In particular, cognitive techniques can be used to better understand the file itself. For example, for a picture, cognitive image analysis can be used to understand who's featured in a given picture. Through analysis, patterns can emerge such as a preference for pictures featuring the mobile device user themselves, or featuring a third party.

Cognitive system 400 combines analysis of the above-noted inputs to create insights 411 and confidence levels 412 that may be stored in a derived user preferences repository 410. For example, using the analysis noted, the following insight and confidence level may have been generated:

Insight: user has a preference for photographs featuring themselves and taken at sporting events; and
Confidence level: 85%

As illustrated in FIG. 5, as nearby contacts (i.e., mobile devices listed in the contacts file of a mobile device) come within mobile ad hoc network transfer range, the facility may send one or more contextual user preferences to each contact within range, effectively asking the mobile device user "Do you have any of the following files?" If so, an automated, mobile ad hoc network transfer is initiated as depicted.

By way of example, an existing mobile device contact 510 becomes available (for instance, user B's mobile device) meaning that the contact users device has come within mobile ad hoc network transfer range and is therefore eligible for a mobile ad hoc network transfer. One or more derived user preferences 501, as described above, may be sent to mobile device user 510 from mobile device 500. Note that the user preferences are contextual user preferences, that is, for example, one user preferences within the context of the current device location. For instance, if the mobile device is currently located in a sports stadium, and the user of mobile device 500 has a preference for their picture being taken during sporting events, then this request is sent to the contact mobile device 510 (e.g., do you have any pictures of me taken at this event at this sports stadium?). If the location of the mobile device is not a sports stadium, then this particular contextual user preference need not be sent. As another example, if a user wishes to receive a latest copy of a tracking spreadsheet from user B's mobile device, then a request may be sent to that contact asking if there is a new version. However, if the user is using their mobile device, and their preference is only to receive the spreadsheet on their tablet, then this request would not be sent. As another example, users A, B, and C may be co-located, with user B being listed in user A's contacts, and user C in user B's contacts, in which case, a request may be generated that user C automatically send user A user C's contact details.

Mobile device 510 receives the user request via the mobile ad hoc network transfer, and when the device has the requested file (e.g., a picture of user A at a sports stadium, or the latest copy of a spreadsheet, etc.), a mobile ad hoc network transfer 502 is initiated automatically forwarding the requested file to mobile device 500. If desired, a confirmation request to a receiving or sending user's mobile device may be provided to initiate a transfer of a resource or receive a resource, before actually sending the resource.

Those skilled in the art will note from the above discussion that provided herein are computer-implemented methods, systems and computer program products for facilitating automated exchange of files between mobile devices. The method includes monitoring use of one or more files received on a mobile device, for instance, via mobile ad hoc network transfer, and deriving contextual user preferences for one or more future automated file transfers to the mobile device based on the monitoring. Further, the method may include sending a contextual user preference request from the mobile device to an other mobile device based, at least in part, on the other mobile device being within mobile ad hoc network range of the mobile device. The contextual user preference request may request that at least one file on the other mobile device related to at least one of the contextual user preferences be automatically transferred to the mobile device using mobile ad hoc network transfer.

In one or more implementations, the other mobile device is an identified contact in the mobile device. Further, the sending may be further based, at least in part, on a context of a current location of the mobile device matching a context associated with the at least one of the contextual user preferences.

In one or more embodiments, the monitoring may include storing data associated with the file(s) received on the mobile device, and tracking how the file(s) received on the mobile device is used. By way of example, the data may include identification of one or more mobile devices sending the one or more files to the mobile device, and for at least one file of the one or more files, a location where transfer of the at least one file via mobile ad hoc transfer occurred. By way of specific example, the data may include who initiated the transfer, and sent the file to the mobile device, what file was transferred, where the transfer took place, and the date and time of the transfer.

In one or more implementations, the deriving may include analyzing the data on how the file(s) received on the mobile device is used, and the file(s) itself to derive the contextual user preferences for the one or more future automated file transfers. Further, in one or more embodiments, the analyzing may include creating insights and associated confidence levels for the insights based, at least in part, on the data, how the file(s) received on the mobile device is used, and the file(s) itself, where the contextual user preferences for the one or more future automated file transfers are based on the insights and the associated confidence levels for the insights. In one or more embodiments, the contextual user preferences for the one or more future automated file transfers may be based on the associated confidence levels of one or more corresponding insights exceeding a set threshold.

Advantageously, disclosed herein is a facility for automatically exchanging files between mobile devices in proximity to each other and based on derived user preferences and contextual awareness. The facility implements an automated process which includes: capturing and storing information about a resource transferred from one mobile device to another mobile device of respective users, where the information may include users who initiated and received a transfer of resources; detecting that the resource or file was transferred, and if desired, the location where the transfer occurred, as well as the date and time of the transfer; determining insights for the mobile device user receiving the file, and a confidence level for the insights using a cognitive system, by analyzing user and sender information relating to the file, how the file is used, identifying the file and its components, including analyzing patterns of usage by the user, and location, time, and user information; and automatically sending a file between the mobile devices, when the devices are within proximity of each other, based on the insights and the confidence level. If desired, a confirmation request may be sent to a receiving or sending user's mobile device to initiate a transfer of a resource or receive resource, before automatically sending the resource.

Exemplary embodiments of a computing environment to implement one or more aspects of the present invention are described below with reference to FIGS. 6-8.

Figure 6:
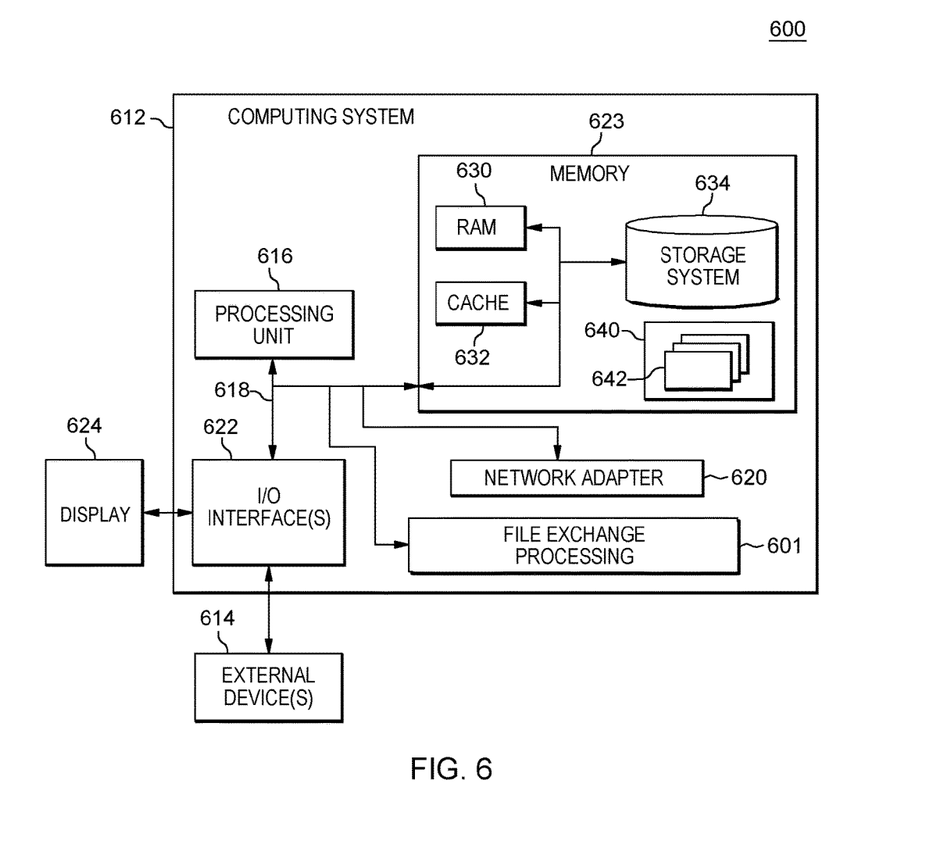
FIG. 6 depicts one embodiment of a computing system which may implement or facilitate implementing file exchange processing, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 632 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, a separate file exchange system, module, logic, etc., 601 may be provided within computing environment 612.

Computing system 612 may also communicate with one or more external devices 614 such as a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computer system/server 612 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computer system/server 612 is capable of being implemented and/or performing any of the functionality set forth hereinabove.

Figure 7:
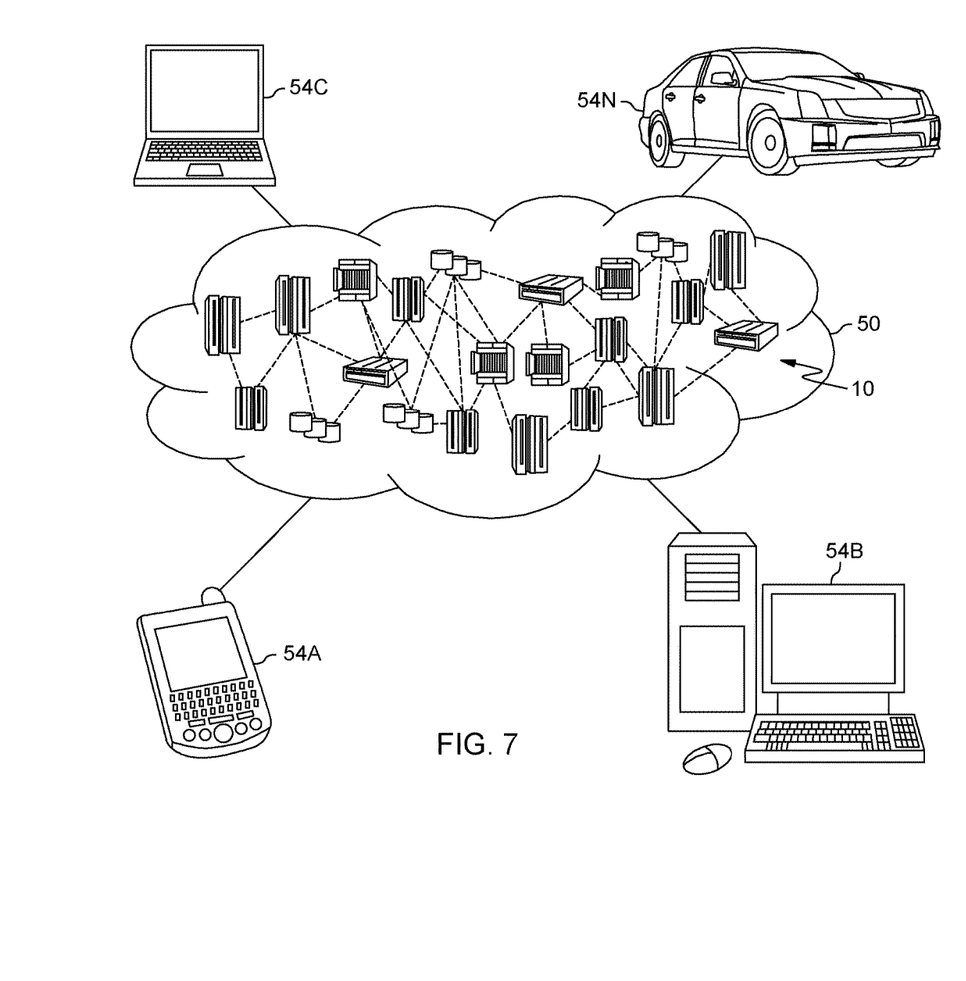
FIG. 7 depicts one embodiment of a cloud computing environment which may facilitate implementing, or be used in association with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
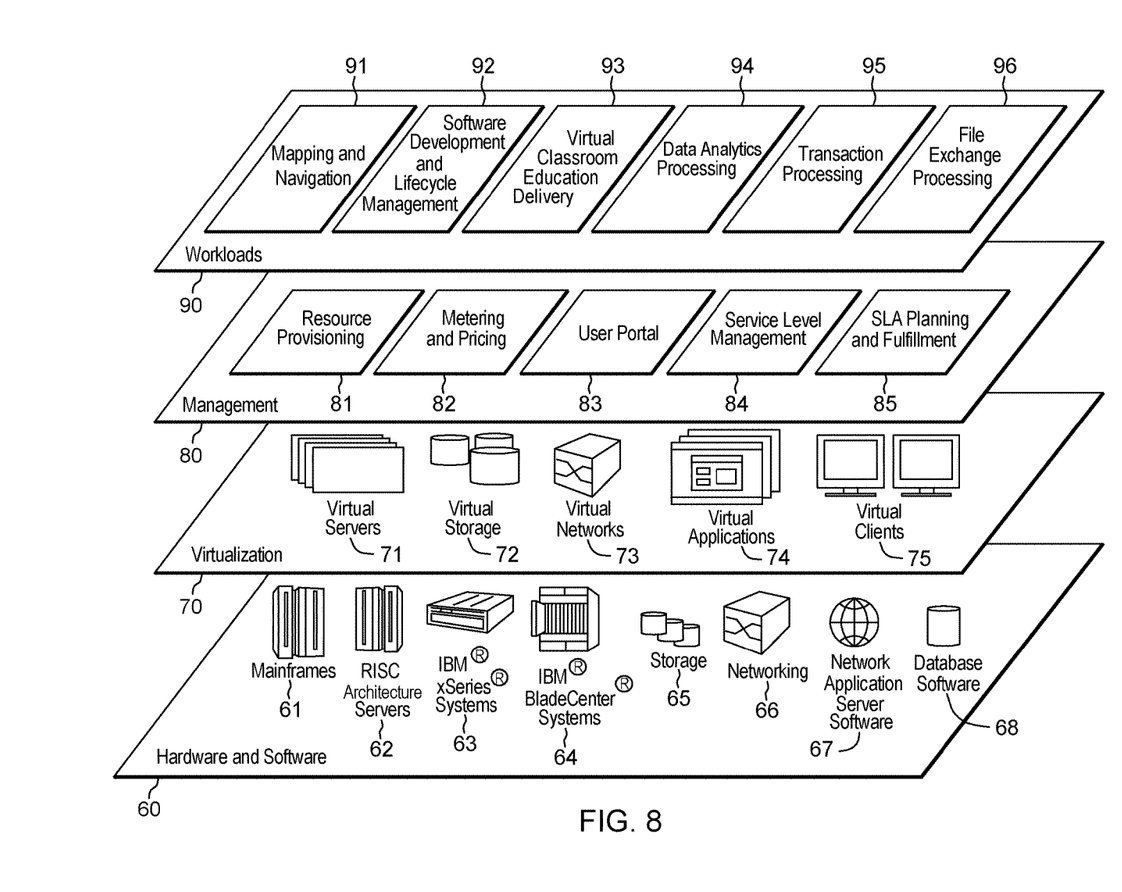
FIG. 8 depicts an example of extraction model layers, which may facilitate implementing file exchange processing, in accordance with one or more aspects of the present invention.

Referring to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file exchange processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
monitoring use of one or more files received on a mobile device;
deriving contextual user preferences for one or more future automated file transfers to the mobile device based on the monitoring;
sending a contextual user preference request from the mobile device to an other mobile device based, at least in part, on the other mobile device being within mobile ad hoc network transfer range of the mobile device, the contextual user preference request requesting that at least one file on the other mobile device related to at least one of the contextual user preferences be automatically transferred to the mobile device using mobile ad hoc network transfer; and
wherein:
the monitoring comprises storing data associated with the file(s) received on the mobile device, and tracking how the file(s) received on the mobile device is used;
the deriving comprises analyzing the data on how the file(s) received on the mobile device is used, and the file(s) itself to derive the contextual user preferences for the one or more future automated file transfers; and
the analyzing comprises creating insights and associated confidence levels for the insights based, at least in part, on the data, how the file(s) received on the mobile device is used, and the file(s) itself, wherein the contextual user preferences for the one or more future automated file transfers are based on the insights and the associated confidence levels for the insights.

2. The computer-implemented method of claim 1, wherein the other mobile device is an identified contact in the mobile device, and the one or more files received on the mobile device were received via mobile ad hoc network transfer.

3. The computer-implemented method of claim 2, wherein the sending is further based, at least in part, on a context of a current location of the mobile device matching a context associated with the at least one of the contextual user preferences.

4. The computer-implemented method of claim 1, wherein the one or more files received on the mobile device were received via mobile ad hoc network transfer, and the data includes identification of one or more mobile devices sending the one or more files to the mobile device, and for at least one file of the one or more files a location where transfer of the at least file via mobile ad hoc network transfer occurred.

5. The computer-implemented method of claim 1, wherein the one or more files received on the mobile device were received via mobile ad hoc network transfer, and the data includes for each file: an identification of a sending mobile device; an identification of the file received via ad hoc network transfer; a location where transfer of the file via mobile ad hoc network transfer occurred; and a date and time of the transfer.

6. The computer-implemented method of claim 1, wherein the contextual user preferences for the one or more future automated file transfers are based on the associated confidence levels of one or more corresponding insights exceeding a set threshold.

7. A system for facilitating mobile ad hoc network exchange of a file between mobile devices, the system comprising:
a memory; and
a processing circuit communicatively coupled to the memory, wherein the system performs a method comprising:
monitoring use of one or more files received on a mobile device;
deriving contextual user preferences for one or more future automated file transfers to the mobile device based on the monitoring;
sending a contextual user preference request from the mobile device to an other mobile device based, at least in part, on the other mobile device being within mobile ad hoc network transfer range of the mobile device, the contextual user preference request requesting that at least one file on the other mobile device related to at least one of the contextual user preferences be automatically transferred to the mobile device using mobile ad hoc network transfer;

wherein the monitoring comprises storing data associated with the file(s) received on the mobile device, and tracking how the file(s) received on the mobile device are used; and the deriving comprises analyzing the data on how the file(s) received on the mobile device is used, and the file(s) itself to derive the contextual user preferences for the one or more future automated file transfers; and wherein the analyzing comprises creating insights and associated confidence levels for the insights based, at least in part, on the data, how the file(s) received on the mobile device is used, and the file(s) itself, wherein the contextual user preferences for the one or more future automated file transfers are based on the insights and the associated confidence levels for the insights.

8. The system of claim 7, wherein the other mobile device is an identified contact in the mobile device, and the one or more files received on the mobile device were received via mobile ad hoc network transfer.

9. The system of claim 8, wherein the sending is further based, at least in part, on a context of a current location of the mobile device matching a context associated with the at least one of the contextual user preferences.

10. The system of claim 7, wherein the deriving comprises analyzing the data on how the file(s) received on the mobile device is used, and the file(s) itself to derive the contextual user preferences for the one or more future automated file transfers.

11. The system of claim 7, wherein the contextual user preferences for the one or more future automated file transfers are based on associated confidence levels of one or more corresponding insights exceeding a set threshold.

12. A computer program product for facilitating mobile ad hoc network exchange of a file between mobile devices, the computer program product comprising:

a computer readable storage medium having computer readable program code embodied therewith, the computer readable program code being executable by a processor to perform a method comprising:

monitoring use of one or more files received on a mobile device;

deriving contextual user preferences for one or more future automated file transfers to the mobile device based on the monitoring;

sending a contextual user preference request from the mobile device to an other mobile device based, at least in part, on the other mobile device being within mobile ad hoc network transfer range of the mobile device, the contextual user preference request requesting that at least one file on the other mobile device related to at least one of the contextual user preferences be automatically transferred to the mobile device using mobile ad hoc network transfer;

wherein the monitoring comprises storing data associated with the file(s) received on the mobile device, and tracking how the file(s) received on the mobile device are used; and the deriving comprises analyzing the data on how the file(s) received on the mobile device is used, and the file(s) itself to derive the contextual user preferences for the one or more future automated file transfers; and wherein the analyzing comprises creating insights and associated confidence levels for the insights based, at least in part, on the data, how the file(s) received on the mobile device is used, and the file(s) itself, wherein the contextual user preferences for the one or more future automated file transfers are based on the insights and the associated confidence levels for the insights.

13. The computer program product of claim 12, wherein the other mobile device is an identified contact in the mobile device, and the one or more files received on the mobile device were received via mobile ad hoc network transfer.

14. The computer program product of claim 13, wherein the sending is further based, at least in part, on a context of a current location of the mobile device matching a context associated with the at least one of the contextual user preferences.

15. The computer program product of claim 14, wherein the deriving comprises analyzing data on how the file(s) received on the mobile device is used, and the file(s) itself to derive the contextual user preferences for the one or more future automated file transfers.

* * * * *